(12) United States Patent
Linton et al.

(10) Patent No.: US 9,243,931 B2
(45) Date of Patent: Jan. 26, 2016

(54) AZ/EL GIMBAL HOUSING CHARACTERIZATION

(71) Applicant: DRS Sustainment Systems, Inc., St. Louis, MO (US)

(72) Inventors: Thomas D. Linton, Lake Saint Louis, MO (US); Jeffrey S. Folmer, Edwardsville, IL (US); Jeffrey S. Fitzgerald, Florissant, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 645 days.

(21) Appl. No.: 13/687,929

(22) Filed: Nov. 28, 2012

(65) Prior Publication Data

US 2015/0285660 A1 Oct. 8, 2015

(51) Int. Cl.
*G01C 25/00* (2006.01)
*G01C 19/54* (2006.01)

(52) U.S. Cl.
CPC .............. *G01C 25/005* (2013.01); *G01C 19/54* (2013.01); *G01C 25/00* (2013.01)

(58) Field of Classification Search
CPC ........ G01C 25/00; B25J 9/1692; B62D 15/02
USPC ................................................ 73/1.75, 1.01
See application file for complete search history.

(56) References Cited

U.S. PATENT DOCUMENTS

| 6,396,235 | B1 | 5/2002 | Ellington et al. | |
| 7,493,231 | B2 * | 2/2009 | Graf | G01C 9/00 33/1 N |
| 2009/0118864 | A1 * | 5/2009 | Eldridge | B25J 9/1692 700/259 |
| 2013/0321197 | A1 * | 12/2013 | Klingler | G01S 7/4026 342/174 |

* cited by examiner

*Primary Examiner* — John Fitzgerald
*Assistant Examiner* — Nathaniel T Woodward
(74) *Attorney, Agent, or Firm* — Kilpatrick Townsend & Stockton LLP

(57) ABSTRACT

Methods, devices, and systems are presented for calibrating or otherwise correcting the pointing accuracy of a gimbal. Measurements of the actual planes of rotation of each of a gimbal's rotatable elements is made using an off-board measurement device, such as a coordinate measuring machine (CMM). The measurements from the off-board device can be combined with those from native, on-board gimbal sensors of the rotation angles at which the planes are tilted/pitched with respect to their nominal planes of rotation. Information representing the error vectors between the nominal and actual planes of rotation is stored and used for correcting the pointing accuracy of the gimbal. The corrected pointing vector of the gimbal can be combined with measurements from an inertial measurement unit (INU) and rangefinder in order to accurately determine a geographic target position to which the gimbal points.

20 Claims, 10 Drawing Sheets

MEASURING AZIMUTH PLANE

MEASURING ELEVATION PLANE

AZ/EL GIMBAL HOUSING CHARACTERIZATION

STATEMENT AS TO RIGHTS TO INVENTIONS MADE UNDER FEDERALLY SPONSORED RESEARCH AND DEVELOPMENT

This invention was made with government support under contract W56HZV-06-C-0538 awarded by the U.S. Army Tank-Automotive & Armaments Command (TACOM). The government has certain rights in the invention.

CROSS-REFERENCES TO RELATED APPLICATIONS

NOT APPLICABLE

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

This disclosure is generally related to directional calibration or correction systems, and more specifically to calibration of gimbal-stabilized reconnaissance and targeting sensors for military and other vehicles.

2. Background

Modern warfare has evolved to value precision weapons, which typically limit collateral damage while reducing ordinance mass required to be delivered to the front lines. Precision weapons include smart bombs, guided missiles and artillery shells, sniper guns, and lasers, among other kinetic and nonkinetic arms. For optimal use, precision weapons require precise targeting so that they can hit their intended targets.

Electro-optical sensors have filled a vast niche required by militaries for precision targeting, as well as reconnaissance, threat warning, and positive target identification. They can be purely passive, relying on sunlight, starlight, or thermal emissions to image a target. Passive image systems do not require illumination from the sensor. Thus, passive image systems can remain hidden from the target as well as others nearby. Light and compact enough to fit on vehicles, they can be taken to a battlefront and employed in combat situations. However, small disturbances to electro-optical sensors, such as vibrations or unsteady hands, are magnified when looking across long distances.

Gimbal stabilization helps electro-optical systems stay pointed at a particular target in the distance, compensating for vibrations as well as movement of a vehicle. Such gimbal-stabilized electro-optical systems have become prevalent on modern military land vehicles and aircraft.

Common gimbal systems for heavy equipment include pan-tilt mechanisms. A pan-tilt mechanism includes a fixed base, a pan assembly, and a tilt assembly. The pan assembly is attached to the fixed base and rotates around a vertical axis. The tilt assembly is mounted to the pan assembly and rotates around the vertical axis with the pan assembly. The tilt assembly also rotates around a horizontal axis to point up or down. Thus, the tilt assembly can be panned (i.e., turned in azimuth) and tilted (i.e., raised in elevation).

A "half-yoke" assembly includes a gimbal with a pan assembly that cantilevers a tilt assembly on one side. A "full-yoke" assembly includes a gimbal with a pan assembly that supports a tilt assembly between two ears.

Smaller gimbal systems can include ball head gimbals. In such a design, a ball head (i.e., a sphere) is held captive by supports. The supports can be fingered, opposite each other like a vise, or formed as a monolithic socket. A platform supported by the sphere can be rotated up and down or side to side as desired.

In any gimbal design, a direction to which the gimbal points can be determined by two angles: an azimuth angle and an elevation angle. These angles can be measured with encoders in motors that drive the azimuth and elevation angles or are otherwise embedded in the gimbal assembly.

Laser rangefinders have been paired with electro-optical systems to determine a position of a target with respect to the vehicle. A pointing vector from the vehicle to the target, along with a distance determined by the rangefinder, can be expressed as a local coordinate. This local coordinate expresses the location of the target with respect to the vehicle. The local coordinate can be used for precision weapon delivery from the vehicle to the target.

An inertial navigation unit (INU) can be used to determine the geographic location of the vehicle (e.g., latitude, longitude, height above mean sea level). With the geographic location vehicle and a position of the target with respect to the vehicle, a geographic location of the target can be easily determined. The geographic coordinate can be used for precision weapon delivery from another vehicle to the target.

Naturally, the more accurate the INU, gimbal assembly, and laser rangefinder, the more accurate a determination of the geographic location of the target. At long ranges from the target, the angular pointing accuracy of the gimbal becomes the driver of accuracy for the entire system.

There is a need in the art for better, more precise, more accurate gimbal assemblies.

BRIEF SUMMARY

Generally, calibration of a gimbal assembly having two rotatable portions is described. The rotatable portions are envisioned as rotating within nominal planes. Each nominal plane can be described by a nominal axis vector. A coordinate measuring machine (CMM) or other off-board device is used to measure a point on the rotatable portion as it is rotated around its nominal axis in order to find the actual plane that it rotates through. The actual plane is typically slightly tilted from the nominal plane due to mechanical tolerances. An on-board encoder built in to the gimbal for operational use can be used in conjunction with the CMM to determine the orientation of the actual plane. An 'actual axis' vector is calculated from the actual plane, and an error between the actual axis and nominal axis is stored. The same is done for the other nominal axis. The errors from both measurements are then used in a polar coordinate transformation to correct a pointing vector indicated by embedded encoders.

Using a laser rangefinder to determine a distance to a target, a precise direction and range to the target can be produced. Adding the local target solution to an ownship position indicated by an internal navigation unit (INU), one can produce an accurate position of a target.

Some embodiments of the present application are related to a method for calibrating a gimbal assembly. The method includes providing a gimbal assembly having a non-rotatable base and a steerable section, the steerable section having portions configured to rotate around a nominal azimuth axis and a nominal elevation axis, steadying the gimbal assembly base, measuring locations of a first single point affixed to the steerable section at different rotation angles of the steerable section around the nominal azimuth axis, measuring locations of a second single point affixed to the steerable section at different elevation angles of the steerable section around the nominal elevation axis, calculating an actual azimuth axis from the measurements at the different rotation angles of the steerable section around the nominal azimuth axis, calculating an actual elevation axis from the measurements at the different rotation angles of the steerable section around the nominal elevation axis, determining an azimuth axis error between the actual azimuth axis and the nominal azimuth axis, determining an elevation axis error between the actual elevation axis and the nominal elevation axis, storing information representing the azimuth axis error and elevation axis error, steering the steerable section of the gimbal assembly to point to a direction in space, acquiring a nominal pointing vector of the steerable section from a rotation angle around the nominal azimuth axis and a rotation angle around the nominal elevation axis, and transforming the nominal pointing vector to a corrected pointing vector using the stored information representing the azimuth and elevation axis errors.

Some embodiments relate to a method for calibrating a gimbal assembly. The method includes measuring a first location of a point affixed to a steerable section of a gimbal assembly with a coordinate measuring machine (CMM) in conjunction with an encoder embedded in the gimbal assembly, and then rotating the steerable section around a first nominal axis of the gimbal assembly, and then measuring a second location of the same point affixed to the steerable section with the CMM and the encoder after the rotating, and then calculating a first actual axis around which the steerable section was rotated using the measurements of the CMM and encoder, determining a direction and magnitude of an axis error between the first actual axis and the first nominal axis, and transforming a nominal pointing vector indicated by the encoder to a corrected pointing vector using the direction and magnitude of the axis error.

Some embodiments relate to a method for calibrating a gimbal assembly. The method includes selecting a point affixed to a steerable section of a gimbal assembly, the steerable section configured to be steered by rotating portions of the steerable section around at least two nominal axes, measuring locations of the point at different rotation angles of the nominal axes using an off-board measuring device and on-board encoders embedded within the gimbal assembly, calculating actual axes from the measurements, determining errors between the calculated actual axes and their respective nominal axes, and computing a transform between a nominal pointing vector indicated by the embedded encoders and a corrected pointing vector using the determined errors.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention.

DETAILED DESCRIPTION

Generally, devices, systems, and methods are disclosed for calibrating a gimbal housing with one or more rotating elements. A rotatable portion of the gimbal is rotated around its axis, and a CMM or other off-board measuring device measures locations of a point on the rotatable portion. The measured point locations are resolved into an actual plane of rotation, which reveals an actual axis of rotation (as opposed to the nominal axis of rotation). A difference, or error, between the actual axis of rotation and nominal axis of rotation is saved, and the difference is used for correcting a pointing vector indicated by the gimbal.

An embedded encoder within the gimbal can be used in conjunction with the CMM for the calibration. The CMM can identify a magnitude that the actual plane of rotation is off axis, and the encoder can identify the direction, with respect to the native encoder, of the maximum (or minimum) difference between the nominal and actual planes.

The errors for two axes of a pan-and-tilt gimbal can be saved as simply four numbers: (1) the angle magnitude of azimuth axis error, (2) the direction of azimuth axis error, (3) the angle magnitude of elevation axis error, and (4) the direction of elevation axis error.

The errors can be used in a coordinate transform to resolve an actual pointing direction of a gimbal with respect to its nominal axes. If, for example, the gimbal rotation axes are aligned with axes of an inertial navigation unit (INU), then a pointing angle with respect to an inertial frame, such as the Earth, can be resolved. Coupled with a distance-finding device, such as a laser rangefinder, an accurate position of a target—to which the gimbal points—can be found.

Figure 1:
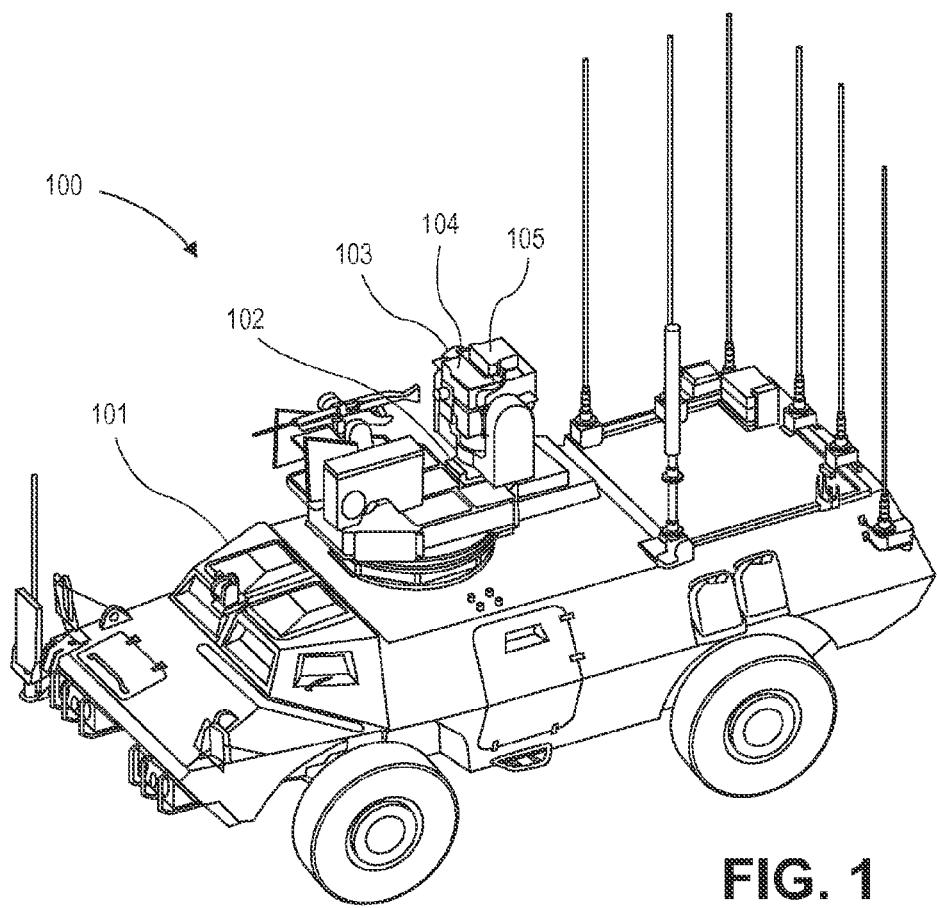
FIG. 1 is a perspective view of an armored land vehicle with a pan-and-tilt gimbaled electro-optical sensor in accordance with an embodiment.

FIG. 1 is a perspective view of an armored land vehicle with a pan-and-tilt gimbaled electro-optical sensor in accordance with an embodiment. System 100 includes armored vehicle 101 upon which are mounted inertial navigation unit (INU) 102, pan-and-tilt gimbal 103, electro-optical sensor 104, and laser rangefinder 105. Axes of INU 102 are nominally aligned to be parallel with the bottom of the base of gimbal 103. The bottom of base of gimbal 103 is designed to be parallel to the azimuth plane of rotation of the gimbal.

Figure 2:
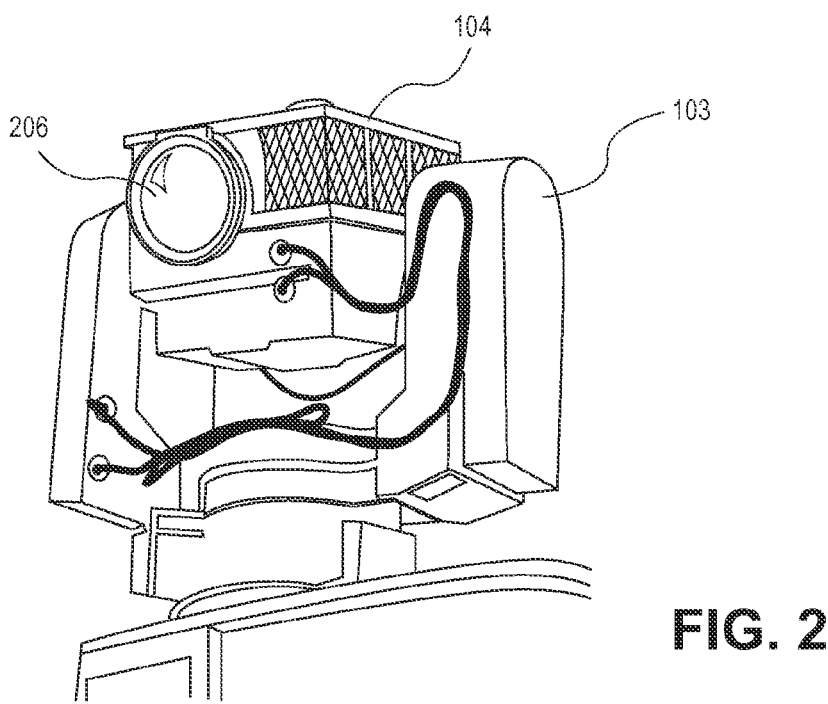
FIG. 2 illustrates a pan-and-tilt gimbal with a sensor in accordance with an embodiment.

FIG. 2 illustrates a pan-and-tilt gimbal with a sensor in accordance with an embodiment. Pan-and-tilt, full-yoke gimbal 103 supports electro-optical sensor 104. Electro-optical sensor incorporates optics for observing, tracking, and zooming into targets behind lens 206.

Figures 3, 4:
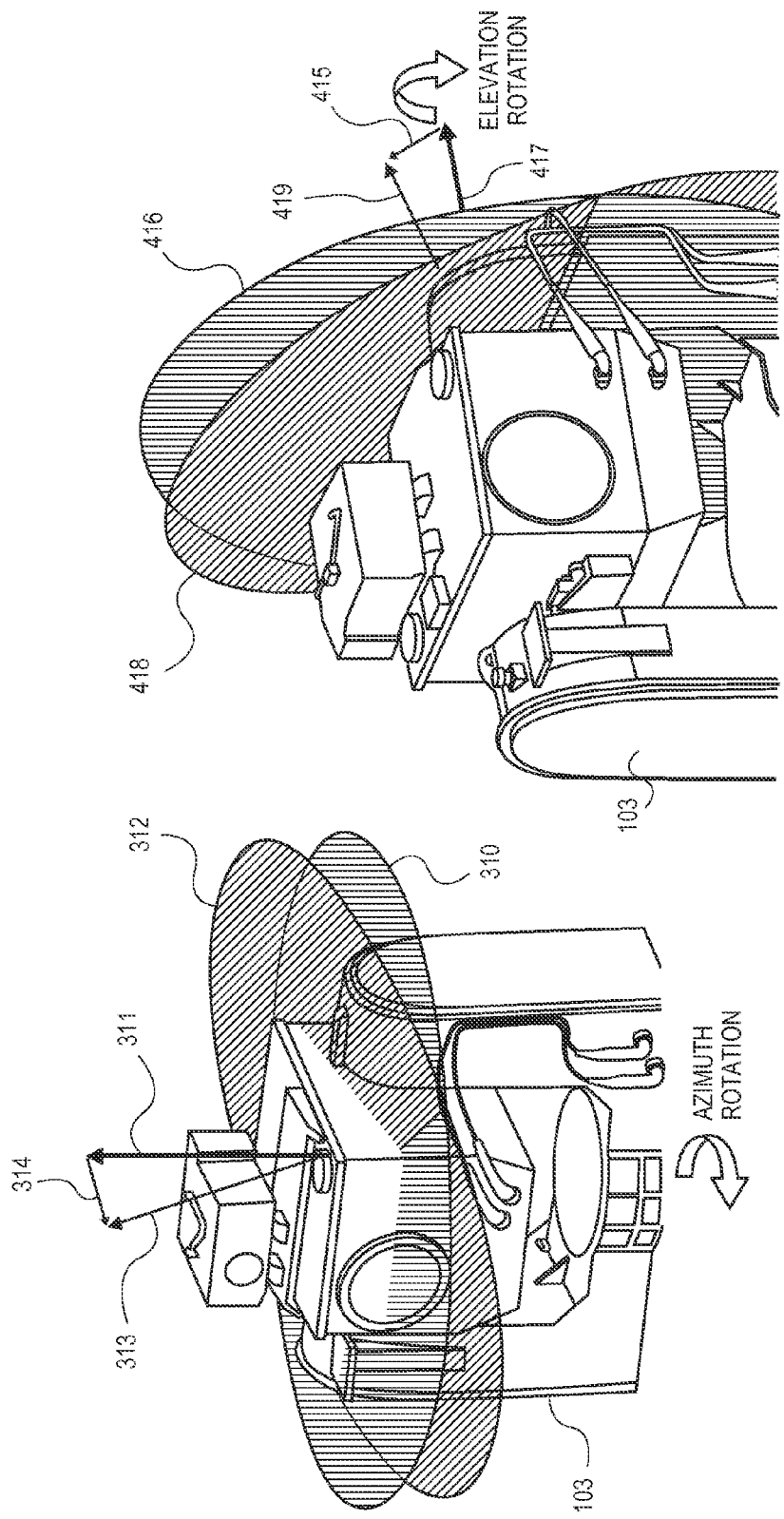
FIG. 3 illustrates an azimuth plane error of the pan-and-tilt gimbal of FIG. 2.
FIG. 4 illustrates an elevation plane error of the pan-and-tilt gimbal of FIG. 2.

FIG. 3 illustrates an azimuth plane error of the pan-and-tilt gimbal of FIG. 2. In any real-world gimbal portions that rotate, there will be a nominal rotation plane and axis around which the portion is designed to rotate. There will also be an actual rotation plane and axis around which the portion actually rotates. The rotating portions can rotate in azimuth, elevation, or other orientations.

A "plane of rotation" includes a plane in which a point on, in, or otherwise affixed to the rotating portion passes as it rotates around an axis, or as otherwise known in the art.

An "axis of rotation" includes a vector that is normal, or orthogonal, to the plane of rotation, or as otherwise known in the art. An axis of rotation can be signed (e.g., "±") to indicate a direction that the vector faces from the plane. An axis of rotation can be expressed as a unit vector (i.e., magnitude=1), which shows direction only.

A "nominal plane of rotation" includes a plane of rotation about which a point on a rotatable portion is designed to rotate. A "nominal axis of rotation" is normal to the nominal plane of rotation.

An "actual plane of rotation" includes a plane of rotation about which a point on, in, or otherwise affixed to a rotatable portion actually rotates. The inventors recognized that larger errors can be modeled by an actual plane of rotation because there is more tilt than wobble or hysteresis in real-world gimbals. An "actual axis of rotation" is normal to the actual plane of rotation.

Nominal azimuth plane of rotation 310 can be defined by nominal azimuth axis 311. Actual azimuth plane of rotation 312 can be defined by actual azimuth axis 313. Azimuth axis error 314 can be expressed as a vector between unit vectors for nominal azimuth axis 311 and actual azimuth axis 313. Mathematically, azimuth axis error 314 can be expressed as a vector subtraction of actual azimuth axis 313 and nominal azimuth axis 311. Azimuth axis error 314 can consist of an angle magnitude and a direction.

An "angle magnitude" includes a magnitude of an error vector, or as otherwise known in the art. For example, an angle magnitude of azimuth axis error 314 can be the magnitude of the vector.

A "direction" of a vector includes a direction of an error vector as projected on a nominal plane of rotation, or as otherwise known in the art. For example, a direction of azimuth axis error 314 can be the direction of the vector projected onto nominal azimuth plane of rotation 310.

FIG. 4 illustrates an elevation plane error of the pan-and-tilt gimbal of FIG. 2. Similar to the errors in the azimuth plane of real-world gimbal 103, there are errors in the elevation plane.

Nominal elevation plane of rotation 416 can be defined by nominal elevation axis 417. Actual elevation plane of rotation 418 can be defined by actual elevation axis 419. Elevation axis error 415 can be expressed as a vector between unit vectors for nominal elevation axis 417 and actual elevation axis 419. Mathematically, elevation axis error 415 can be expressed as a vector subtraction of actual elevation axis 419 and nominal elevation axis 417. Elevation axis error 415 can consist of an angle magnitude and a direction. For example, an angle magnitude of elevation axis error 415 can be the magnitude of the vector, and a direction of elevation axis error 415 can be the direction of the vector when projected onto nominal elevation plane of rotation 416.

Figure 5:
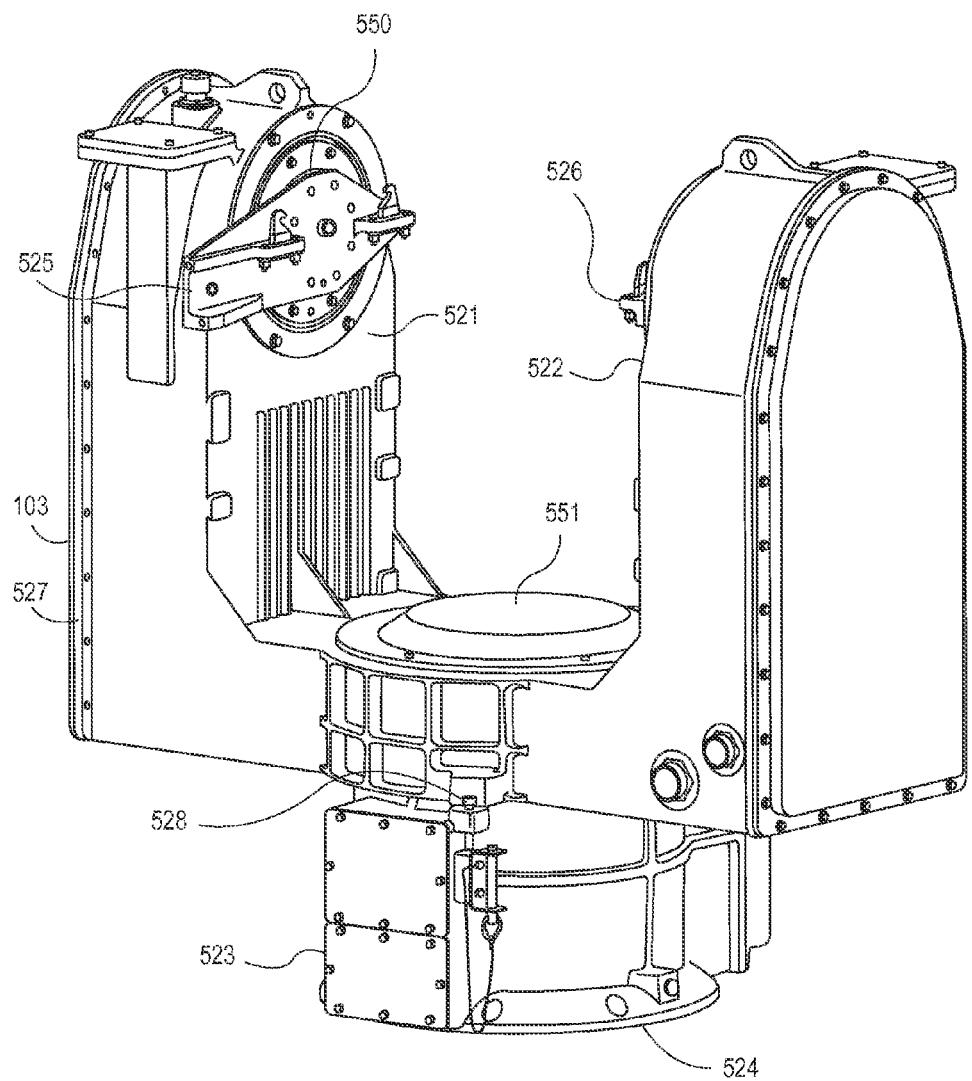
FIG. 5 illustrates a pan-and-tilt gimbal, without an electro-optical sensor installed, in accordance with an embodiment.

FIG. 5 illustrates a pan-and-tilt gimbal, without an electro-optical sensor installed, in accordance with an embodiment. Pan-and-tilt gimbal 103 includes steerable section 527 mounted on non-rotating base 523. Steerable section 527, which is a full-yoke gimbal assembly, includes right hand (RH) arm 521 and left hand (LH) arm 522, which rotate with respect to base 523 in azimuth. The direction in azimuth to which the gimbal points can be read by embedded encoder 551. Similarly, the direction in elevation to which the gimbal points can be read by embedded encoder 550. The encoders are "on-board," meaning that they are part of the fielded version of the gimbal or as otherwise known in the art.

Arms 521 and 522 rotate in a nominal plane of rotation that is parallel with bottom mounting surface 524 of base 523. By mounting an INU and a base to a flat plate, a vertical axis of the INU and a nominal azimuth rotation axis of the gimbal are parallel and aligned.

Steerable section 527 also includes right hand ear 525 and left hand ear 526, which rotate up and down with respect to yoke arms 521 and 522, to which they are mounted, respectively. Right and left hand ears 525 and 526 rotate up and down in unison.

Locking, tapered, alignment pin 528, inserted through holes in steerable section 527 and base 523, keeps steerable section 527 in the same azimuth angle for elevation measurements. A similar locking, tapered, alignment pin, inserted through holes in ears 525/526 and arm 521, keep steerable section 527 in the same elevation angle for azimuth measurements.

Base 523 can be steadied by setting its mounting surface 524 on a floor, solid footing, or other immovable object. Base 523 can also be steadied by bolting to a slanted or uneven surface or otherwise as known in the art.

Figure 7:
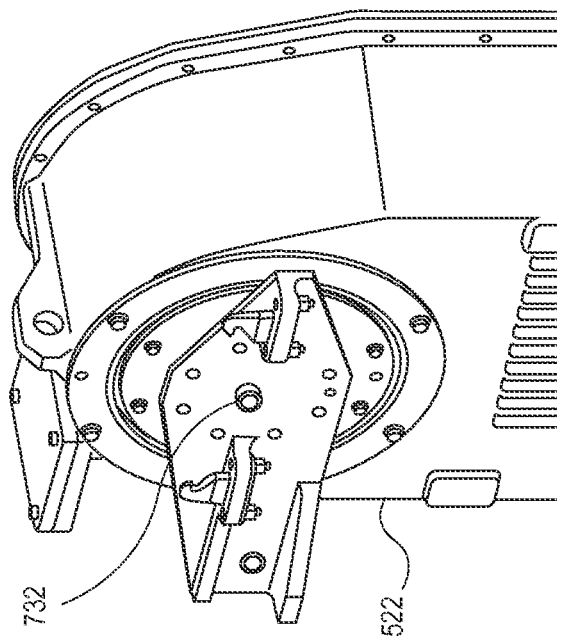
FIG. 7 illustrates a left hand (LH) arm of the pan-and-tilt gimbal of FIG. 5.
Figure 6:
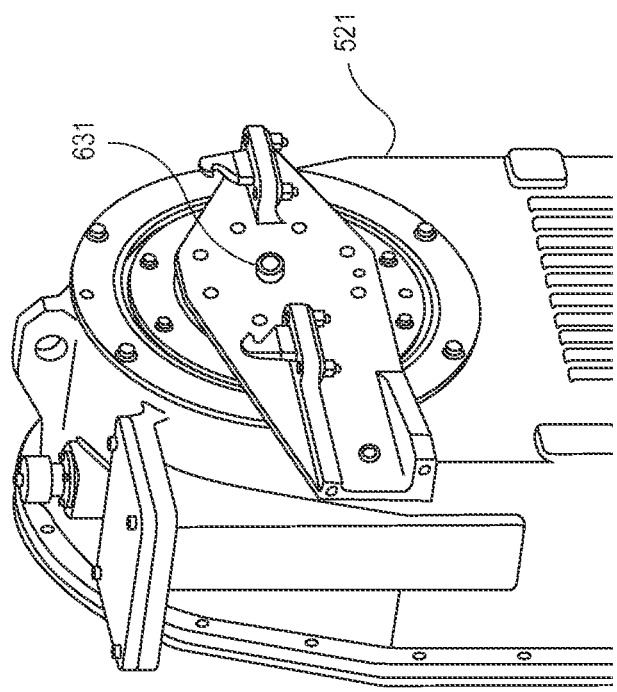
FIG. 6 illustrates a right hand (RH) arm of the pan-and-tilt gimbal of FIG. 5.

FIGS. 6 and 7 illustrate a right hand arm and left hand arm of the pan-and-tilt gimbal of FIG. 5, respectively. A nominal elevation axis can be measured by a CMM when alignment pin 528 (see FIG. 5) is installed. On right hand arm 521, a point on the nominal elevation axis can be measured by finding the center of right hand round boss 631. On left hand arm 522, another point on the elevation axis can be measured by finding the center of left hand arm round boss 732. A line between these points defines the nominal elevation axis.

Figure 8:
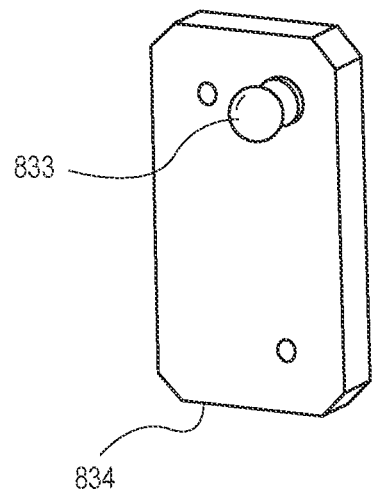
FIG. 8 illustrates a bracket with a construction ball in accordance with an embodiment.

FIG. 8 illustrates a bracket with a construction ball in accordance with an embodiment. Construction ball 833 is attached to rigid bracket 834 for measurements by a CMM. The bracket can be mounted or otherwise affixed on an end of an ear of steerable section 527.

Figure 9:
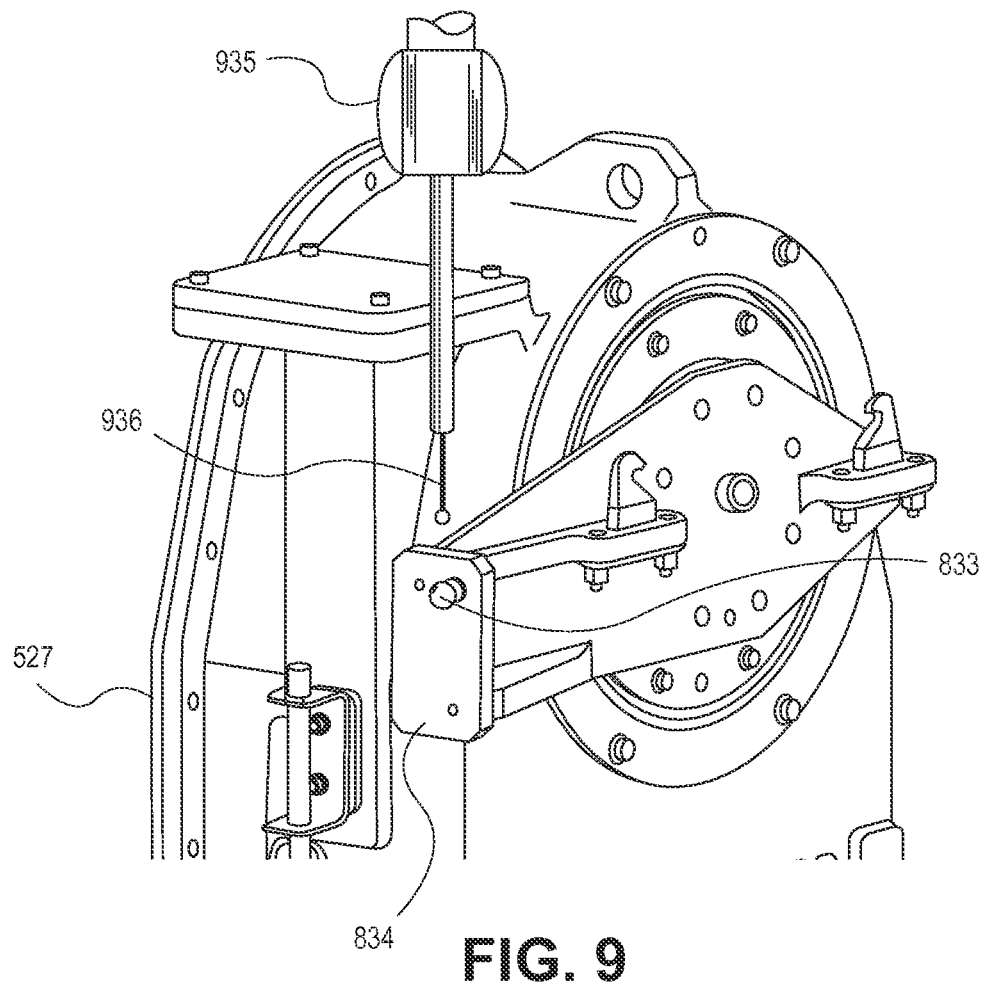
FIG. 9 illustrates the bracket and construction ball of FIG. 8 mounted on pan-and-tilt gimbal and being measured by a coordinate measuring machine in accordance with an embodiment.

FIG. 9 illustrates the bracket and construction ball of FIG. 8 mounted on pan-and-tilt gimbal and being measured by a coordinate measuring machine in accordance with an embodiment. CMM machine arm 935 supports probe 936, which taps against construction ball 833 of bracket 834. Tapping in at least three opposite locations on the construction ball, in order to collect position measurements, gives three points on the outer surface of the construction ball that can be resolved to a single point in the center of the construction ball. Thus, a location of a point (i.e., the point in the center of construction ball 833) that is affixed to steerable section 527 is measured.

The steerable section is then rotated in azimuth or elevation about the respective nominal axis, and the construction ball 833 is tapped at least three times again for another measurement. This process is repeated for several angles in order to measure an actual plane of rotation of the point affixed to the steerable section of the gimbal. Alternatively, a point on the gimbal itself can be tapped to determine its position with a CMM.

Figure 10:
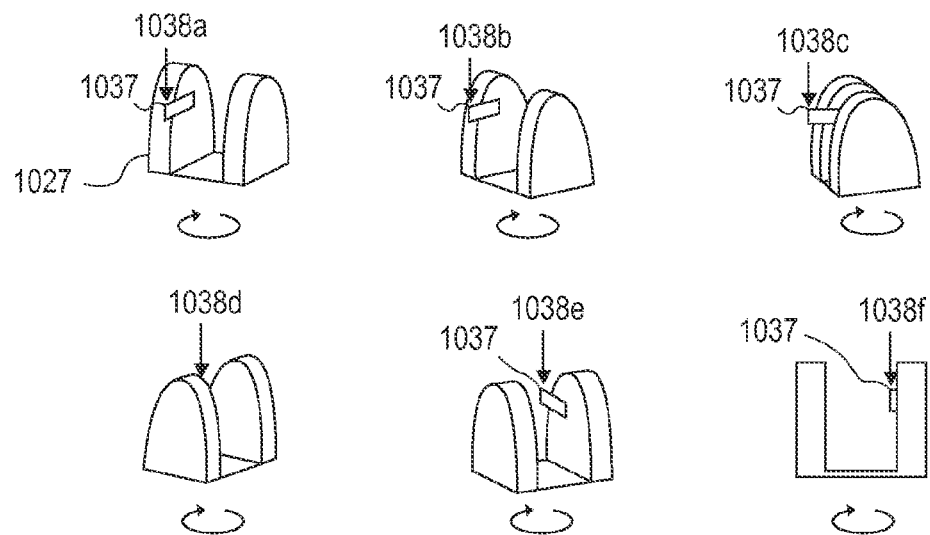
FIG. 10 illustrates measuring locations of a single point affixed to a gimbal at different azimuth angles in accordance with an embodiment.

FIG. 10 illustrates measuring locations of a single point affixed to a gimbal at different azimuth angles in accordance with an embodiment. As steerable section 1027 is rotated in azimuth, point 1037 changes in position. Locations 1038*a-f* of point 1037 at different azimuth angles are measured. Specifically, the height (z) of each location, with respect to the horizontal azimuth plane, is measured by a CMM and stored. The (x, y) location in the horizontal plane as measured by the CMM can also be stored.

In the alternative or in addition, a rotation angle of steerable section 1027 as measured by an embedded encoder or other angle measuring device that is part of the gimbal can be stored. This 'native' azimuth angle, along with the height measured by the CMM, make up a coordinate that is stored for analysis. For example, a coordinate can be stored as: (angle as measured by embedded encoder, height as measured by CMM). The mixed use of an angle measured by a native, on-board encoder along with a height measured by an external, off-board machine (i.e., the CMM) can simplify and speed the measurement process and provide corrections in the native angles as measured by the encoders.

Figure 11A:
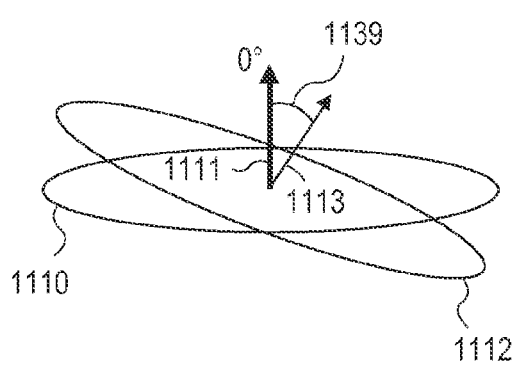
FIG. 11A illustrates an angle magnitude of an azimuth axis error in accordance with an embodiment.
Figure 11B:
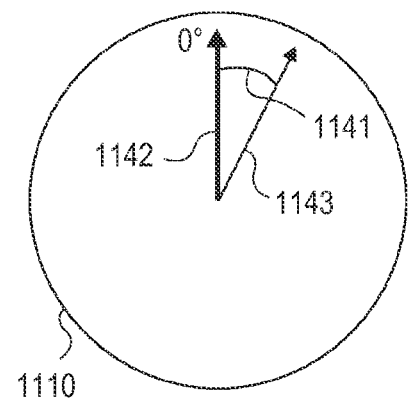
FIG. 11B illustrates a direction of an azimuth axis error in accordance with an embodiment.

FIGS. 11A-B illustrate an angle magnitude and direction of an azimuth axis error, respectively, in accordance with an embodiment. Nominal plane of rotation 1110 can be defined by nominal azimuth axis unit vector 1111, and actual plane of rotation 1112 can be defined by actual azimuth axis unit vector 1113. The difference between unit vectors 1111 and 1113 is an azimuth axis error. Angle magnitude 1139 is the magnitude (in degrees, radians, gradians, etc.) of the difference between unit vectors 1111 and 1113.

In FIG. 11B, direction 1142 represents a zero angle, and direction 1143 represents the direction that a vector between unit vectors 1111 and 1113 faces (see FIG. 11A) when projected onto nominal plane of rotation 1110. The difference in the angles is direction 1141.

Thus, angle magnitude 1139 and direction 1141 of an error vector between unit vectors 1111 and 1113 can be stored compactly and succinctly for later corrections to a pointing vector.

Figure 12:
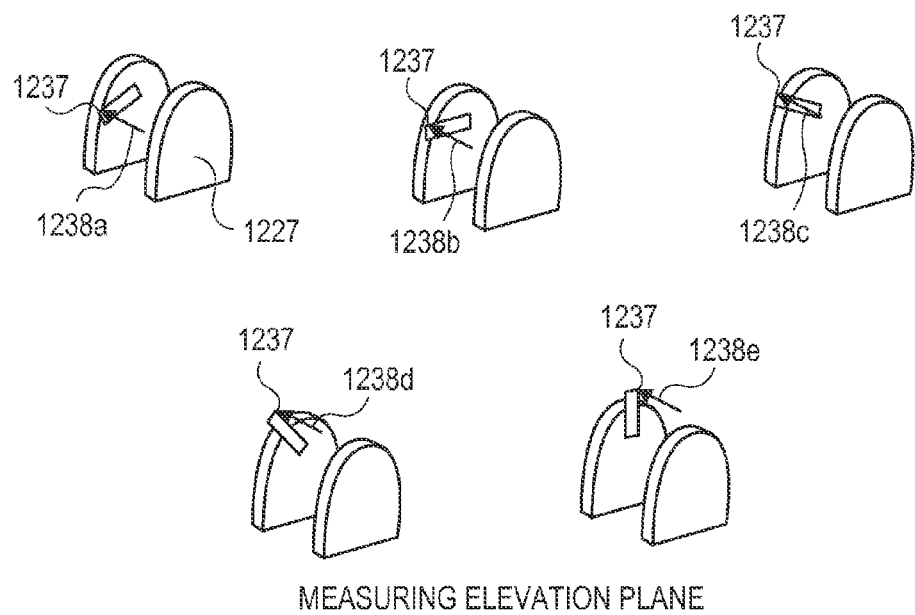
FIG. 12 illustrates measuring locations of a single point affixed to a gimbal at different elevation angles in accordance with an embodiment.

FIG. 12 illustrates measuring locations of a single point affixed to a gimbal at different elevation angles in accordance with an embodiment. As steerable section 1227 is rotated in elevation, point 1237 changes in position. Locations 1238*a-e* of point 1237 at different elevation angles are measured. Specifically, the crosswise x-position of each location, with respect to the vertical elevation plane, is measured by a CMM and stored. The (y, z) location as measured by the CMM can also be stored.

In the alternative or in addition, an elevation rotation angle of steerable section 1227 as measured by an embedded encoder or other angle measuring device that is part of the gimbal can be stored. This 'native' elevation angle, along with the x-position, make up a coordinate that is stored for analysis. The technical advantages of this are similar to those discussed above for azimuth measurements.

Less angles may be measured in elevation than in azimuth because the gimbal can only point up and down by a limited amount, while it can rotate freely 360° in azimuth.

Figures 13A, 13B:
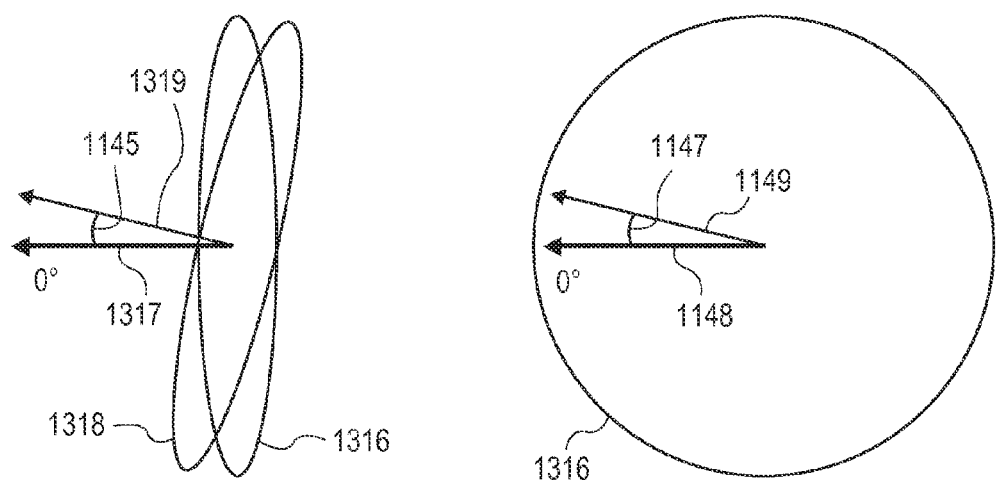
FIG. 13A illustrates an angle magnitude of an elevation axis error in accordance with an embodiment.
FIG. 13B illustrates a direction of an elevation axis error in accordance with an embodiment.

FIGS. 13A-B illustrate an angle magnitude and direction of an elevation axis error, respectively, in accordance with an embodiment. Nominal plane of rotation 1316 can be defined by nominal elevation axis unit vector 1317, and actual plane of rotation 1318 can be defined by actual elevation axis unit vector 1319. The difference between unit vectors 1317 and 1319 is an elevation axis error. Angle magnitude 1145 is the magnitude (in degrees, radians, gradians, etc.) of the difference between unit vectors 1317 and 1319.

In FIG. 13B, direction 1148 represents a zero angle, and direction 1149 represents the direction that a vector between unit vectors 1317 and 1319 (see FIG. 13A) faces when projected into nominal plane of rotation 1316. The difference in the angles is direction 1147.

Angle magnitude 1145 and direction 1147 of an error vector between unit vectors 1317 and 1319 can be stored compactly and succinctly for calibration.

One can use the angle magnitudes and directions in a coordinate transform to calibrate or otherwise correct readings in the field. For example, if encoders embedded in the azimuth and elevation motors of a gimbal produce a particular azimuth angle and elevation angle to which the gimbal is pointed, those angles can be effectively corrected by the azimuth and elevation error angle magnitudes and directions. A central processor can acquire a nominal pointing vector of the gimbal from the azimuth encoder and elevation encoder, which give a rotation angle around the nominal azimuth axis and a rotation angle around the nominal elevation axis, respectively. That pointing vector can be subject to a coordinate transformation to correct it using the stored information representing the azimuth and elevation axis errors.

The corrected pointing vector can be used to determine a geographic target position at which the gimbal assembly points. A range to a target can be determined using a laser rangefinder. A vector from the gimbal to the target can be calculated and normalized to the inertial frame using the orientation of the gimbal provided by the INU. The ownship position vector (from the INU) can then be added to a vector representing the location of the target with respect to ownship.

Figure 14:
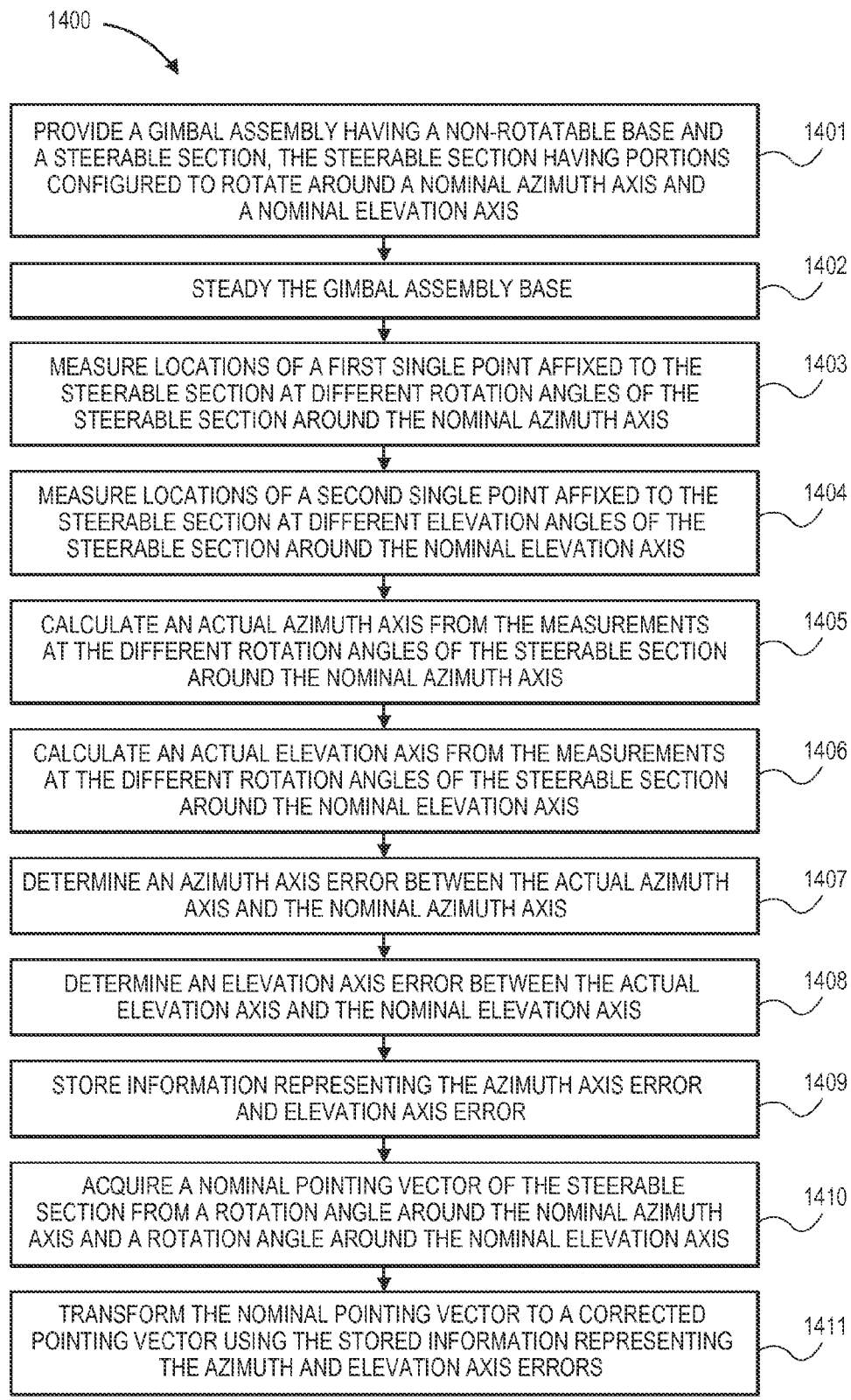
FIG. 14 is a flowchart illustrating a process in accordance with an embodiment.

FIG. 14 is a flowchart illustrating a process in accordance with an embodiment. Process 1400 can be performed at a factory or by others as appropriate. In operation 1401, a gimbal assembly having a non-rotatable base and a steerable section is provided, the steerable section having portions configured to rotate around a nominal azimuth axis and a nominal elevation axis. In operation 1402, the gimbal base is steadied, such as by placing it on a level floor or bolting it down. The gimbal base may be steadied throughout the next few operations. In operation 1403, locations of a first single point affixed to the sterrable section are measured at different rotation angles of the steerable section around the nominal azimuth axis. In operation 1404, locations of a second single point affixed to the steerable section are measured at different elevation angles of the steerable section around the nominal elevation axis. In operation 1405, an actual azimuth axis is calculated from the measurements at the different rotation angles of the steerable section around the nominal azimuth axis. In operation 1406, an actual elevation axis is calculated from the measurements at the different rotation angles of the steerable section around the nominal elevation axis. In operation 1407, an azimuth axis error between the actual azimuth axis and the nominal azimuth axis is determined. In operation 1408, an elevation axis error between the actual elevation axis and the nominal elevation axis is determined. In operation 1409, information representing the azimuth axis error and elevation axis error is stored. In operation 1410, a nominal pointing vector of the steerable section is acquired from a rotation angle around the nominal azimuth axis and a rotation angle around the nominal elevation axis. In operation 1411, the nominal pointing vector is transformed to a corrected pointing vector using the stored information representing the azimuth and elevation axis errors.

Figure 15:
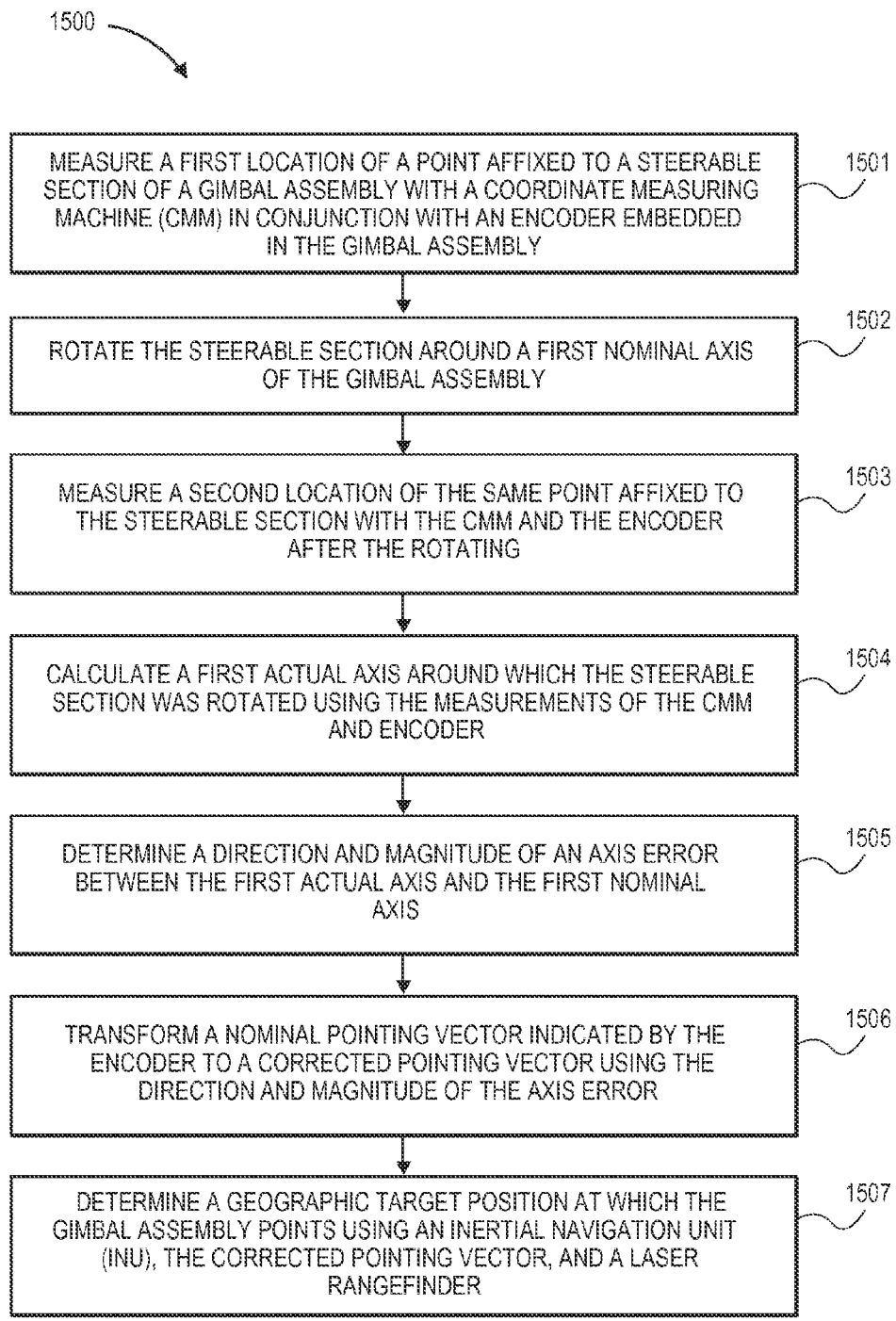
FIG. 15 is a flowchart illustrating a process in accordance with an embodiment.

FIG. 15 is a flowchart illustrating a process in accordance with an embodiment. Process 1500 can be performed at a factory or by others as appropriate. In operation 1501, a first location of a point affixed to a steerable section of a gimbal assembly is measured with a coordinate measuring machine (CMM) in conjunction with an encoder embedded in the gimbal assembly. A height from a CMM and an angle from the encoder might be measured. In operation 1502, the steerable section is rotated around a first nominal axis of the gimbal assembly. In operation 1503, a second location of the same point affixed to the steerable section is measured with the CMM and the encoder after the rotating. In operation 1504, a first actual axis around which the steerable section was rotated is calculated using the measurements of the CMM and encoder. In operation 1505, a direction and magnitude of an axis error between the first actual axis and the first nominal axis is determined. In operation 1506, a nominal pointing vector indicated by the encoder is transformed to a corrected pointing vector using the direction and magnitude of the axis error. In operation 1507, a geographic target position at which the gimbal assembly points is determined using an inertial navigation unit (INU), the corrected pointing vector, and a laser rangefinder.

Figure 16:
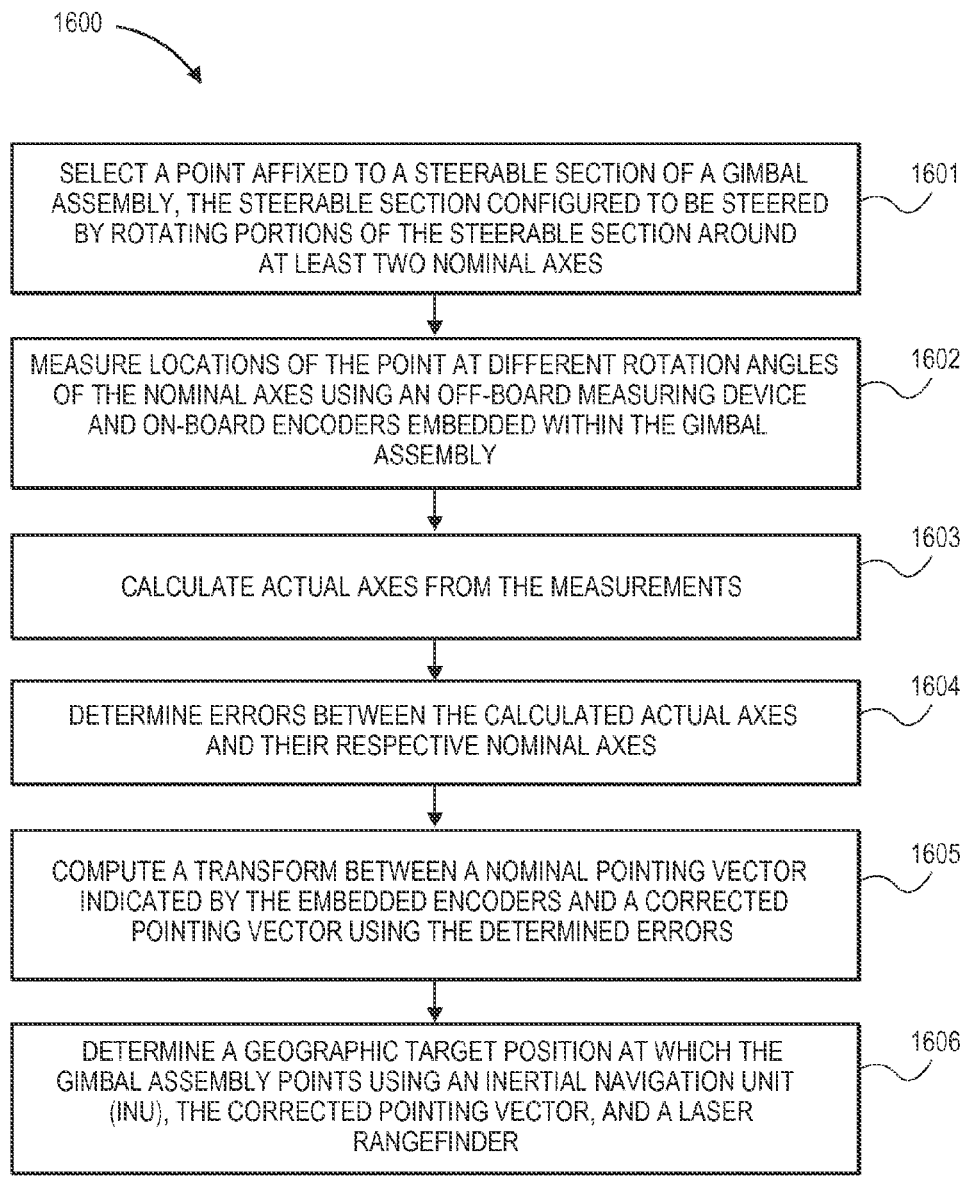
FIG. 16 is a flowchart illustrating a process in accordance with an embodiment.

FIG. 16 is a flowchart illustrating a process in accordance with an embodiment. Process 1600 can be performed at a factory or by others as appropriate. In operation 1601, a point affixed to a steerable section of a gimbal assembly is selected, the steerable section configured to be steered by rotating portions of the steerable section around at least two nominal axes. In operation 1602, locations of the point at different rotation angles of the nominal axes are measured using an off-board measuring device and on-board encoders embedded within the gimbal assembly. In operation 1603, actual axes are calculated from the measurements. In operation 1604, errors between the calculated actual axes and their respective nominal axes are determined. In operation 1605, a transform between a nominal pointing vector indicated by the embedded encoders and a corrected pointing vector are computed using the determined errors. In operation 1606, a geographic target position at which the gimbal assembly points is determined using an inertial navigation unit (INU), the corrected pointing vector, and a laser rangefinder.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

One or more features from any embodiment may be combined with one or more features of any other embodiment without departing from the scope of the technology.

A recitation of "a", "an" or "the" is intended to mean "one or more" unless specifically indicated to the contrary.

What is claimed is:

1. A method for calibrating a gimbal assembly, the method comprising:
   providing a gimbal assembly having a non-rotatable base and a steerable section, the steerable section having portions configured to rotate around a nominal azimuth axis and a nominal elevation axis;
   steadying the gimbal assembly base;
   measuring locations of a first single point affixed to the steerable section at different rotation angles of the steerable section around the nominal azimuth axis;
   measuring locations of a second single point affixed to the steerable section at different elevation angles of the steerable section around the nominal elevation axis;
   calculating an actual azimuth axis from the measurements at the different rotation angles of the steerable section around the nominal azimuth axis;
   calculating an actual elevation axis from the measurements at the different rotation angles of the steerable section around the nominal elevation axis;
   determining an azimuth axis error between the actual azimuth axis and the nominal azimuth axis;
   determining an elevation axis error between the actual elevation axis and the nominal elevation axis;
   storing information representing the azimuth axis error and elevation axis error;
   steering the steerable section of the gimbal assembly to point to a direction in space;
   acquiring a nominal pointing vector of the steerable section from a rotation angle around the nominal azimuth axis and a rotation angle around the nominal elevation axis; and
   transforming the nominal pointing vector to a corrected pointing vector using the stored information representing the azimuth and elevation axis errors.

2. The method of claim 1 wherein the acquiring is performed using an encoder connected with the gimbal assembly.

3. The method of claim 1 further comprising:
   determining a geographic target position at which the gimbal assembly points using an inertial navigation unit (INU), encoders connected with the gimbal assembly, the stored information representing the azimuth axis error and elevation axis error, and a laser rangefinder.

4. The method of claim 1 further comprising:
   inserting an alignment pin into the gimbal assembly between measuring around the nominal azimuth axis and measuring around the nominal elevation axis.

5. The method of claim 1 wherein the steadying the gimbal assembly base is selected from the group consisting of setting the base on a flat surface without attachment and bolting the base to an object.

6. The method of claim 1 further comprising:
   measuring locations of points on an axle of the gimbal assembly in order to determine the nominal azimuth or elevation axis.

7. The method of claim 1 further comprising:
   changing a temperature of the gimbal assembly;
   repeating the measurings, calculatings, and determinings of axis errors in order to update the stored information representing the azimuth axis error and elevation axis error.

8. The method of claim 1 wherein at least one of the measurings is conducted using both a coordinate-measuring machine and an encoder connected with the gimbal assembly.

9. The method of claim 8 wherein the information representing the azimuth axis error and elevation axis error includes storing:
an angle magnitude of the azimuth axis error;
a direction of the azimuth axis error;
an angle magnitude of the elevation axis error,
a direction of the elevation axis error; and
wherein the stored direction of the azimuth axis error or direction of the elevation axis error is with respect to a direction indicated by the encoder.

10. The method of claim 1 wherein the gimbal assembly is selected from the group consisting of a pan-tilt gimbal and a ball head gimbal.

11. The method of claim 10 wherein the gimbal is a pan-tilt gimbal and includes a half-yoke or full-yoke assembly.

12. The method of claim 1 wherein the first and second points affixed to the steerable section are the same point.

13. The method of claim 12 further comprising:
attaching a removable construction ball to the steerable section for the measurements, wherein the first and second points are at a geometric center of the construction ball.

14. The method of claim 13 wherein the measuring is conducted using a coordinate-measuring machine.

15. The method of claim 13 wherein the construction ball is mounted on the end of a rod.

16. A method for calibrating a gimbal assembly, the method comprising:
measuring a first location of a point affixed to a steerable section of a gimbal assembly with a coordinate measuring machine (CMM) in conjunction with an encoder embedded in the gimbal assembly; and then
rotating the steerable section around a first nominal axis of the gimbal assembly; and then
measuring a second location of the same point affixed to the steerable section with the CMM and the encoder after the rotating; and then
calculating a first actual axis around which the steerable section was rotated using the measurements of the CMM and encoder;
determining a direction and magnitude of an axis error between the first actual axis and the first nominal axis; and
transforming a nominal pointing vector indicated by the encoder to a corrected pointing vector using the direction and magnitude of the axis error.

17. The method of claim 16 further comprising:
revolving the steerable section around a second nominal axis of the gimbal assembly; and then
measuring a third location of the same point affixed to the steerable section with the CMM and a second encoder after the revolving; and then
calculating a second actual axis around which the steerable section was revolved using the measurements of the CMM and second encoder;
determining a direction and magnitude of a second axis error between the second actual axis and the second nominal axis; and
transforming a nominal pointing vector indicated by the second encoder to the corrected pointing vector using the direction and magnitude of the second axis error.

18. The method of claim 16 further comprising:
determining a geographic target position at which the gimbal assembly points using an inertial navigation unit (INU), the corrected pointing vector, and a laser rangefinder.

19. A method for calibrating a gimbal assembly, the method comprising:
selecting a point affixed to a steerable section of a gimbal assembly, the steerable section configured to be steered by rotating portions of the steerable section around at least two nominal axes;
measuring locations of the point at different rotation angles of the nominal axes using an off-board measuring device and on-board encoders embedded within the gimbal assembly;
calculating actual axes from the measurements;
determining errors between the calculated actual axes and their respective nominal axes; and
computing a transform between a nominal pointing vector indicated by the embedded encoders and a corrected pointing vector using the determined errors.

20. The method of claim 19 further comprising:
determining a geographic target position at which the gimbal assembly points using an inertial navigation unit (INU), the corrected pointing vector, and a laser rangefinder.

* * * * *